United States Patent Office 2,731,823
Patented Jan. 24, 1956

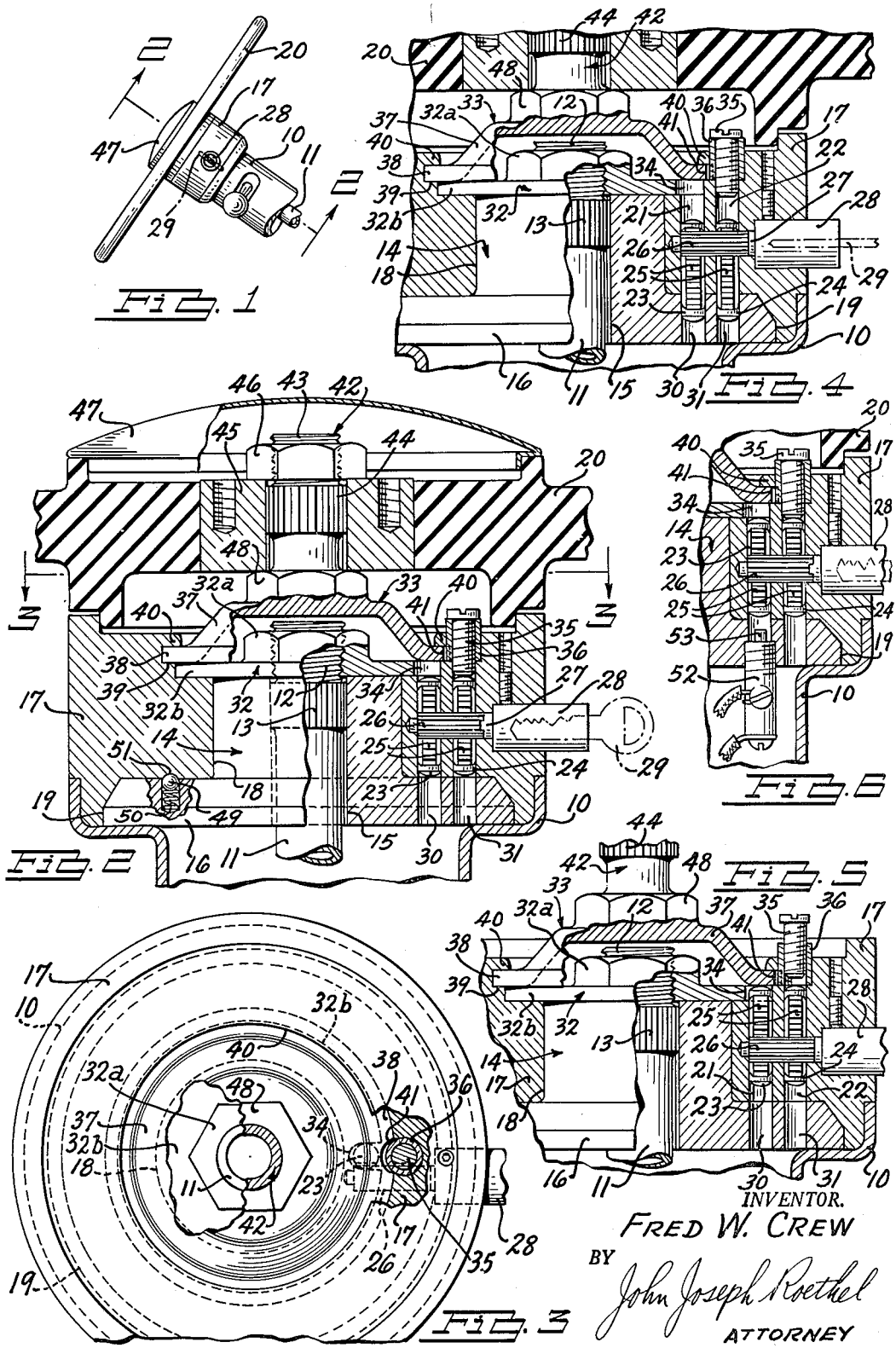

2,731,823

STEERING WHEEL MOUNTING DEVICE

Fred W. Crew, Detroit, Mich.

Application October 26, 1953, Serial No. 388,386

7 Claims. (Cl. 70—218)

This invention relates to a vehicle steering wheel mounting mechanism which includes means whereby the steering wheel may be selectively rendered effective or ineffective to steer the vehicle, it being an object of the present invention to provide such a wheel mounting mechanism which is compact, simple to manufacture, easily installed and efficient and durable in use.

More particularly the present invention comprises a hub member adapted to be mounted on the upper end of the vehicle steering post and keyed or splined against rotation relative thereto. The hub member has removably journalled thereon a housing member which is provided with steering wheel receiving means. A key actuated means is mounted in the housing member and is adapted in one position thereof to lock the housing member to the hub member against relative rotation. Thus, when the key actuated means is in said one position, the housing and hub members are locked together so that turning movement of the steering wheel will be transmitted to the steering post and steering linkage permitting the vehicle to be guided. In a second position thereof the key actuated means permits the housing member to be freely rotatable relative to the hub member. In this latter condition, the steering wheel will be ineffective to steer the vehicle and thus will be a deterrent to any attempted theft of the vehicle.

Other features and objects of the particular embodiment of the invention herein illustrated will appear in the following description, reference being had to the accompanying drawings forming a part of the specification wherein like reference numerals designate corresponding parts in the several views.

Fig. 1 is a side view of a vehicle steering wheel and column embodying the present invention.

Fig. 2 is a sectional view taken substantially through line 2—2 of Fig. 1 looking in the direction of the arrows.

Fig. 3 is a top elevation in part sectional of Fig. 2.

Fig. 4 is a fragmentary sectional view in part similar to Fig. 2 illustrating parts of the mechanism in different positions.

Fig. 5 is a fragmentary sectional view in part similar to Figs. 2 and 4 and illustrating parts of the mechanism in yet another position.

Fig. 6 is a fragmentary sectional view illustrating a modification of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings wherein there is illustrated, by way of example, a certain embodiment of the present invention, the numeral 10 designates generally the steering column of a motor vehicle, which column 10 encloses the steering post or rod 11. The post 11 is generally hollow to permit the passage therethrough of the necessary wires such as the wires connecting the horn button to the horn. It will be understood that the steering post 11 is adapted to be connected to any conventional linkage mechanism for transmitting turning movement of the steering post into turning movement of the vehicle wheels.

The steering post 11 is provided at its upper extremity with a threaded portion 12 and immediately below the threaded portion 12 with a spline portion 13. A hub member 14 is mounted on the upper end of the steering post 11, the hub member having a centrally located bore 15 therethrough provided with a spline portion adapted to cooperate with the steering post spline portion 13 to maintain the hub member 14 on said steering post and non-rotatable relative thereto. The hub member at the lower end thereof is provided with a flange 16.

The hub member 14 has journalled thereon a cylindrical housing member 17. As best viewed in Fig. 2, the housing member 17 is centrally bored at 18 to receive the hub member 14 and counterbored at 19 to receive the flange 16 of the hub member. The hub member 14 is thus substantially enveloped by the housing member 17.

As will be more fully explained, the housing member 17 has mounted thereon the vehicle steering wheel 20. Turning movement of the steering wheel 20 must be transmitted through the housing member 17 to the hub member 14 and through the hub member to the steering post 11. The housing member 17 has been described as being journalled on the hub member 14 and accordingly in order for the housing member 17 to transmit steering wheel turning movement to the hub member 14, a means for selectively locking one to the other must be provided. In accordance with the present invention, the manner in which the housing member 17 is locked to the hub member 14 is best described with reference to Figs. 2 and 4. The housing member 14 is provided with a pair of pin receiving apertures 21 and 22, respectively. The housing member 17 is provided with a pair of up and down movable pins 23 and 24, slidable within the apertures 21 and 22 respectively. Each of the pins 23 and 24 are provided with longitudinally extending rack teeth 25. The rack teeth 25 on the respective pins 23 and 24 are operatively and simultaneously engageable by a pinion shaft 26 suitably journalled in the housing member 17. The pinion shaft 26 is operatively coupled for rotation in either direction to the shaft 27 of a conventional key operated device 28, such as used to lock a vehicle door. The shaft 27 of the key operated device 28 can only be rotated upon the proper key 29 being inserted therein.

Referring now to Fig. 2, the pins 23 and 24 are shown retracted wholly into the housing member 17. With the pins 23 and 24 so retracted, the housing member 17 is freely rotatable relative to the hub member 14 and any turning movement exerted on the steering wheel 20 would be ineffective to cause turning movement of the steering post 11. It will be noted that the flange 16 of the hub member 14 is provided with two spaced holes 30 and 31 corresponding to the apertures 21 and 22 respectively in the housing member 17. Movement of the pins 23 and 24 downwardly from their positions shown in Fig. 1 to the positions shown in Fig. 4, that is, partly into the holes 30 and 31, such movement being caused by rotation of the pinion shaft 26 by appropriate turning movement of the key 29 in the key operated device 28, results in the housing member 17 and hub member 14 being effectively keyed to each other so that rotation of the housing member 17 will cause corresponding rotation of the hub member 14.

An important feature of construction of the present invention is the means whereby the housing member 17 is retained on the hub member 14. The retaining means comprises a combination nut and washer device 32, the device having a nut portion 32a and a washer portion 32b. The nut portion 32a of the retaining device 32 is adapted to engage the threaded portion 12 of the steering post and the washer portion 32b thereof is adapted to overlie a portion of the hub member 14 and the housing member 17. The important feature about the retaining device 32 is that the nut portion 32a thereof is not accessible to a wrench and therefore cannot be threaded onto the steering post threaded portion 12 except under certain conditions. The reason the retaining device nut portion 32a is not accessible to a wrench is that it is concealed beneath the steering wheel mounting member, generally designated 33, which, as will be more fully explained, is irremovably mounted on the housing member 17.

Referring to Figs. 2 and 3, the washer portion 32b of the retaining device 32 is provided with a notch 34 at the circumference thereof. The notch 34 is adapted to receive the pin 23 as shown in Fig. 5. It is only when the pin 23 is in the notch 34 that the retaining device 32 can be threaded on or off the threaded portion 12 of the steering post 11. That is, it is necessary to rotate the whole housing member 17 in order to thread the nut portion 32a on or off the steering post threaded portion 12 and such rotation of the housing member 17 is effective to rotate the retaining device 32 only when both are rendered non-rotatable relative to each other by the coaction between the notch 34 and the pin 23.

The pin 23 is movable into engagement with the notch 34 through appropriate turning of the key 29 in the key operated device 28. A blocking means is provided to normally restrict movement of the pin 23 into engagement with the notch 34 on the retaining device 32. This blocking means comprises a screw 35 threaded into a boss 36 in the housing member 17. The boss 36 overlies the upper end of the aperture in which the pin 24 is journalled and as shown in Fig. 2 the screw 35 normally projects downwardly a distance sufficient to prevent movement of the pin 24 upwardly. Since the pins 23 and 24 are operatively related through the pinion shaft 26, the restriction on the upward movement of the pin 24 effectively restricts upward movement of the pin 23. Only when the screw 35 is backed out of the path of the pin 24, as shown in Fig. 5, may the pin 23 be moved upwardly into engagement with the notch 34.

As has been stated, the retaining member 32 is concealed beneath the steering wheel mounting member 33. This member 33 comprises an inverted dish-like base portion 37 having a flange 38 thereon. The flange 38 is adapted to be received in a counterbore or recess 39 in the housing member 17 and is adapted to be irremovably retained therein in any suitable manner. As illustrated, the housing member 17 would be provided with some excess metal adapted to be spun over to provide a permanent retaining ring 40. The flange 38 is notched at 41 to engage the boss 36 thus locking the member 33 against any possibility of rotation relative to the housing member. The wheel mounting member 33 is provided with a stem 42 corresponding to the upper end of the steering post 11. The stem 42 is provided at its upper end with a threaded portion 43 and immediately therebelow with a spline portion 44. The spline portion 44 cooperates with the splines on the metal insert 45 in the steering wheel 20 to hold the steering wheel against rotation relative to the housing member 17 and the threaded portion 43 is adapted to receive a nut 46 to prevent longitudinal displacement of the steering wheel. An appropriate cover plate 47 is provided to conceal the end of the mounting member 33 and the nut 46 thereon.

It will be noted that the stem 42 is provided with a nut-like portion 48 immediately above the inverted dish portion 37. This nut-like portion 48 is adapted to be grasped by a wrench so that the mechanism embodied in the present invention may be mounted on the steering post 11, the pin 23 having first been engaged with the notch 34 of the retaining member 32 as hereinbefore described. With the pin 23 in the notch 34, turning movement exerted on the nut-like portion 48 will be transmitted to the housing member 17 to the retaining device 32 permitting the nut portion 32a thereof to be screwed on or off the threaded portion 12 of the steering post 11, as desired.

A small ball 49, urged upwardly by a spring 50 may be mounted in the flange 16 of the hub member 14 to coact with a recess 51 in the housing member 17 thereby to provide a means of locating or indicating the point at which the pins 23 and 24 are in alignment with the holes 30 and 31. The spring pressed ball 50 would when engaged with the recess 51 provide very slight resistance against turning movement of the steering wheel until the key 29 could be turned in the locking device 28 to move the pins 23 and 24 downwardly.

In Fig. 6 there is illustrated one manner in which a switch, generally designated 52, may be positioned on the device, said switch being inserted in the ignition circuit of the vehicle to prevent the vehicle from being started until the pins 23 and 24 have been moved into the position shown in Fig. 4. Upon the pin 24 being moved downwardly it would engage the plunger 53 of the switch and move the same in a direction to close the switch, thereby permitting the starter button or other control to be operated to start the vehicle starter motor. The ignition circuit cutout switch preferably would be provided as a safety device to prevent anyone from driving the vehicle when the steering wheel was freely rotatable relative to the steering post.

It is believed that the manner of using the mechanism herein described will be readily understood from the foregoing description. The vehicle operator first inserts the key 29 into the key cylinder device 28 and then rotates the steering wheel until the pins 23 and 24 are in alignment with the holes 30 and 31 respectively. This position of alignment will be indicated by the feel of the spring pressed ball 49 engaging the recess 51, or by any suitable visual alignment indicia provided on the steering column 10. The key 29 is then turned to move the pins 23 and 24 downwardly into engagement with the respective holes 30 and 31. The key device 28 usually is provided with a lost motion arrangement to permit the key 29 to be rotated to a neutral position to permit withdrawal of the key from the device 28 without corresponding rotation of the shaft 27 thereof. The steering wheel is thus operatively connected to the steering post 11 and the vehicle may be guided over the highway.

To render the steering wheel ineffective to steer the vehicle, it is only necessary to turn the key 29 in the key device 28 a sufficient distance in the opposite direction so that the shaft 27 thereof and therefore the pinion shaft 26 will be rotated to restore the pins 23 and 24 to their position shown in Fig. 1, thus uncoupling the steering post 11 from the steering wheel 20.

The foregoing construction and mode of operation has the advantage that the turnable wheels of the vehicle are not locked against turning movement even though the steering wheel is rendered ineffective to steer the vehicle. In an emergency the vehicle turnable wheels may be manipulated from the outside of the vehicle to permit the vehicle to be pushed and guided from its parking place. Thus, illegally parked vehicles or those in the way of emergency equipment, such as fire vehicles, may be easily moved. Yet, the freely rotatable steering wheel will be an effective deterrent to anyone attempting to surreptitiously drive the vehicle away.

I claim:

1. A vehicle steering wheel mounting mechanism comprising a first member adapted to be connected to a steering post for turning movement therewith, a second member, retainer means concealed between a part of said second member and said first member and releasably secured to said steering post and rotatably securing said second member on said first member, means on said second member adapted to receive the steering wheel, and locking means mounted in said second member movable in one direction into engagement with said first member thereby to couple said members together to render said steering wheel effective to turn said steering post, said locking means being movable in the opposite direction to lock said second member to said retainer means whereby said second member and retainer means may be moved as a unit to release said retainer means from said steering post.

2. A vehicle steering wheel mounting mechanism comprising a first member adapted to be connected to a steering post for turning movement therewith, a second member, retainer means concealed between a part of said second member and said first member and threaded to said steering post and rotatably securing said second member on said first member, means on said second member adapted to receive the steering wheel, and locking means mounted in said second member movable in one direction into engagement with said first member thereby to couple said members together to render said steering wheel effective to turn said steering post, said locking means being movable in the opposite direction to lock said second member to said retainer means whereby said second member and retainer means may be rotated as a unit to unthread said retainer means from said steering post.

3. The combination with a steering post and a steering wheel, a hub member secured to the post for turning movement therewith, a housing member, the wheel being carried by said housing member, retaining means secured to said post rotatably securing said housing member on said post and hub member, and a locking device carried by the housing member adapted in one position thereof to secure the housing member to the hub member so that turning movement of the steering wheel will be transmitted to the steering post, and in a second position thereof permitting said housing member to rotate freely on said hub member, said locking means having a third position in which said housing member is freely rotatable relative to said hub member but is coupled to said retaining means so that turning movement of the housing member may be transmitted to the retaining means to remove the same from said post.

4. The combination with a steering post and a steering wheel, a hub member secured to the post for turning movement therewith, a housing member, means mounting said steering wheel on said housing member for turning movement therewith, retaining means removably engaged with said post and rotatably retaining said housing member on said hub member, said retaining means being effective to maintain said housing member and hub member against removal from said post, said retaining means being concealed beneath said steering wheel mounting means, and locking means carried by said housing member, said locking means in one position thereof allowing said housing member to rotate relative to said hub member, said locking means in a second position thereof locking said housing member to said hub member thereby rendering the steering wheel effective to turn the steering post in either direction, said locking means in a third position thereof locking said housing member to said retaining means whereby said housing member and retaining means may be moved to disengage the retaining means from said post.

5. A steering wheel mounting mechanism comprising a hub member adapted to be mounted on a steering post for turning movement therewith, a body member journalled on said hub member, a retaining member carried by said body member and freely rotatable thereon, steering wheel mounting means carried by said body member and concealing said retaining means, locking means movable in one direction to lock said retaining means to said body member so that turning movement of the body member may be transmitted to the retaining means to enable the latter to be manipulated into retaining engagement with said steering post, and means normally in position to restrict movement of said locking means in said one direction, said last mentioned means being selectively movable to non-restricting position, said locking means being movable in the opposite direction to lock said body member to said hub member thereby to render a steering wheel effective to turn the steering post.

6. A steering wheel mounting mechanism comprising a hub member adapted to be mounted on a steering post for turning movement therewith, a body member journalled on said hub member, a retaining member carried by said body member and freely rotatable thereon, steering wheel mounting means carried by said body member and concealing said retaining means, locking means movable in one direction to lock said retaining means to said body member so that turning movement of the body member may be transmitted to the retaining means to enable the latter to be manipulated into retaining engagement with said steering post, means normally in position to restrict movement of said locking means in said one direction, said last mentioned means being selectively movable to non-restricting position, said locking means being movable in the opposite direction to lock said body member to said hub member thereby to render a steering wheel effective to turn the steering post, said locking means comprising a pair of spaced pins movable in a direction longitudinally of the steering post, and key operated rack and gear means for moving said pins in either of said directions.

7. A vehicle steering wheel mounting mechanism comprising a base member adapted to be mounted on a steering post for turning movement therewith, an outer member rotatably journalled on said base member, steering wheel receiving means carried on top of said outer member, said steering wheel receiving means substantially duplicating the upper portion of a steering post and being in spaced axial alignment therewith when said base member is mounted thereon, retainer means concealed between a part of said base member and said receiving means and adapted to be threaded to a steering post for releasably securing said base member thereon, said retainer means also being effective to prevent axial displacement of said outer member relative to said base member, and locking means mounted on said outer member movable in one direction into engagement with said base member thereby to couple said members together to render a steering wheel mounted on said receiving means effective to turn said steering post, said locking means being movable in the opposite direction to lock said outer member to said retainer means whereby said outer member and retainer means may be rotated as a unit to unthread said retainer means from the steering post.

References Cited in the file of this patent
UNITED STATES PATENTS

| | | |
|---|---|---|
| 1,438,004 | Vincent | Dec. 5, 1922 |
| 1,452,879 | King | Apr. 24, 1923 |
| 1,617,458 | Renaud | Feb. 15, 1927 |